US008571978B2

(12) United States Patent
Reid et al.

(10) Patent No.: US 8,571,978 B2
(45) Date of Patent: *Oct. 29, 2013

(54) METHOD AND SYSTEM FOR PROVIDING ASSURANCE AND FINANCING SERVICES

(75) Inventors: William Reid, Castro Valley, CA (US); Craig Swackhammer, Pleasanton, CA (US); Kerry Lynch, Pleasanton, CA (US); Johnson Lau, Singapore (SG)

(73) Assignee: Visa International Service Association, San Francisco, CA (US)

( * ) Notice: Subject to any disclaimer, the term of this patent is extended or adjusted under 35 U.S.C. 154(b) by 1908 days.

This patent is subject to a terminal disclaimer.

(21) Appl. No.: 11/132,067

(22) Filed: May 17, 2005

(65) Prior Publication Data
US 2005/0283416 A1 Dec. 22, 2005

Related U.S. Application Data (60) Provisional application No. 60/581,021, filed on Jun. 17, 2004.

(51) Int. Cl.
*G06Q 20/10* (2012.01)
*G06Q 20/04* (2012.01)
*G06Q 40/02* (2012.01)
*G06Q 20/02* (2012.01)

(52) U.S. Cl.
USPC .................. 705/39; 705/42; 705/40; 705/44; 705/26.3

(58) Field of Classification Search
CPC ..... G06Q 20/10; G06Q 20/04; G06Q 20/108; G06Q 40/02; G06Q 20/02
USPC ......... 705/26, 35, 37, 39, 40, 42, 38, 44, 26.3
See application file for complete search history.

(56) References Cited

U.S. PATENT DOCUMENTS

| 3,990,558 A | 11/1976 | Ehrat |
| 4,001,568 A | 1/1977 | Iizuka et al. |

(Continued)

FOREIGN PATENT DOCUMENTS

| WO | WO 99/33016 A1 | 7/1999 |
| WO | WO 99/56193 A2 | 11/1999 |

(Continued)

OTHER PUBLICATIONS

Unknown, Fitch Ratings. Banks. Special Report. Securitization and Banks. A reiteration of Fitch's view of securitization's effect on bank ratings in the new context of regulatory capital and accounting reform. Feb. 25, 2004. www.fitchratings.com pp. 1-18.*

(Continued)

*Primary Examiner* — Barbara Joan Amelunxen
(74) *Attorney, Agent, or Firm* — Kilpatrick Townsend & Stockton LLP (57) ABSTRACT

A system for conducting commercial transactions between buyers and sellers is disclosed. The system includes a transaction processing system for facilitating payment for transactions between buyers and the sellers. In addition to the buyer and the seller, the transaction processing system also interacts with issuers and acquirers. The transaction processing system monitors and manages payment information relating to transactions conducted between buyers and sellers. Using such information, the transaction processing system further offers a number of additional financing services including, for example, buyer payment assurance, buyer bank payment assurance, buyer bank payable discounting, buyer bank payable discount aggregation, seller/receivable financing and seller bank receivable discount aggregation.

30 Claims, 4 Drawing Sheets

(56) References Cited

U.S. PATENT DOCUMENTS

| | | | |
|---|---|---|---|
| 4,116,469 A | 9/1978 | Harriman et al. | |
| 4,280,037 A | 7/1981 | Schmidhauser | |
| D263,638 S | 3/1982 | Donlin | |
| 4,325,277 A | 4/1982 | Uchida et al. | |
| 4,360,727 A | 11/1982 | Lehmann | |
| 4,370,649 A | 1/1983 | Fuerle | |
| 4,480,737 A | 11/1984 | Jamgochian et al. | |
| 4,545,475 A | 10/1985 | Fillod et al. | |
| 4,577,061 A | 3/1986 | Katzeff et al. | |
| 4,585,936 A | 4/1986 | Sellier | |
| 4,607,335 A | 8/1986 | Mizuno | |
| 4,675,515 A | 6/1987 | Lucero | |
| D290,954 S | 7/1987 | Read | |
| 4,713,761 A | 12/1987 | Sharpe et al. | |
| 4,796,193 A | 1/1989 | Pitchenik | |
| 4,797,540 A | 1/1989 | Kimizu | |
| 4,799,156 A * | 1/1989 | Shavit et al. | 705/26.3 |
| 4,822,984 A | 4/1989 | Remery et al. | |
| 4,858,121 A | 8/1989 | Barber et al. | |
| 4,860,946 A | 8/1989 | Braud | |
| 4,864,110 A | 9/1989 | Guillou | |
| D304,725 S | 11/1989 | Rose | |
| 4,890,228 A | 12/1989 | Longfield | |
| 4,893,237 A | 1/1990 | Unno | |
| 4,906,826 A | 3/1990 | Spencer | |
| 4,920,256 A | 4/1990 | Marty et al. | |
| 4,939,351 A | 7/1990 | Alaux et al. | |
| 4,947,028 A | 8/1990 | Gorog | |
| 4,972,463 A | 11/1990 | Danielson et al. | |
| 4,974,878 A | 12/1990 | Josephson | |
| 5,003,585 A | 3/1991 | Richer | |
| 5,007,084 A | 4/1991 | Materna et al. | |
| 5,055,657 A | 10/1991 | Miller et al. | |
| 5,056,645 A | 10/1991 | Vidondo | |
| 5,134,656 A | 7/1992 | Kudelski | |
| 5,136,632 A | 8/1992 | Bernard | |
| 5,191,193 A | 3/1993 | Le Roux | |
| 5,192,855 A | 3/1993 | Insulander et al. | |
| 5,193,057 A | 3/1993 | Longfield | |
| 5,216,620 A | 6/1993 | Sansone | |
| 5,222,018 A | 6/1993 | Sharpe et al. | |
| 5,225,977 A | 7/1993 | Hooper et al. | |
| 5,237,159 A | 8/1993 | Stephens et al. | |
| 5,255,182 A | 10/1993 | Adams | |
| 5,258,906 A | 11/1993 | Kroll et al. | |
| 5,269,521 A | 12/1993 | Rossides | |
| 5,284,253 A | 2/1994 | Watt et al. | |
| 5,285,883 A | 2/1994 | Le Hong et al. | |
| 5,289,923 A | 3/1994 | Coblentz et al. | |
| 5,291,304 A | 3/1994 | Horii et al. | |
| 5,297,030 A | 3/1994 | Vassigh et al. | |
| 5,297,674 A | 3/1994 | Birutis et al. | |
| 5,305,383 A | 4/1994 | Guillou et al. | |
| 5,315,511 A | 5/1994 | Matsuura et al. | |
| 5,336,870 A | 8/1994 | Hughes et al. | |
| 5,359,183 A | 10/1994 | Skodlar | |
| 5,359,509 A | 10/1994 | Little et al. | |
| 5,375,172 A | 12/1994 | Chrosny | |
| 5,383,113 A | 1/1995 | Kight et al. | |
| 5,387,784 A | 2/1995 | Sarradin | |
| RE34,872 E | 3/1995 | Lucero | |
| 5,403,025 A | 4/1995 | Shanley | |
| 5,412,190 A | 5/1995 | Josephson et al. | |
| 5,412,191 A | 5/1995 | Baitz et al. | |
| 5,412,886 A | 5/1995 | Quinn | |
| 5,424,938 A * | 6/1995 | Wagner et al. | 705/42 |
| 5,472,116 A | 12/1995 | Barbe et al. | |
| 5,478,993 A | 12/1995 | Derksen | |
| 5,479,510 A | 12/1995 | Olsen et al. | |
| 5,491,325 A | 2/1996 | Huang et al. | |
| 5,492,212 A | 2/1996 | Fillod et al. | |
| 5,504,677 A | 4/1996 | Pollin | |
| 5,532,464 A | 7/1996 | Josephson et al. | |
| 5,532,920 A | 7/1996 | Hartrick et al. | |
| 5,536,923 A | 7/1996 | Foglino | |
| 5,575,374 A | 11/1996 | Orus et al. | |
| 5,580,310 A | 12/1996 | Orus et al. | |
| 5,583,759 A | 12/1996 | Geer | |
| 5,586,036 A | 12/1996 | Pintsov | |
| 5,590,196 A | 12/1996 | Moreau | |
| 5,590,197 A | 12/1996 | Chen et al. | |
| 5,591,949 A | 1/1997 | Bernstein | |
| D378,219 S | 2/1997 | Marshlack | |
| 5,614,892 A | 3/1997 | Ward, II et al. | |
| 5,620,182 A | 4/1997 | Rossides | |
| 5,635,695 A | 6/1997 | Feiken | |
| 5,637,846 A | 6/1997 | Boers et al. | |
| 5,637,848 A | 6/1997 | Lewiner et al. | |
| 5,652,786 A | 7/1997 | Rogers | |
| 5,655,023 A | 8/1997 | Cordery et al. | |
| 5,671,364 A | 9/1997 | Turk | |
| D385,304 S | 10/1997 | Griffin | |
| 5,675,650 A | 10/1997 | Cordery et al. | |
| D386,882 S | 11/1997 | Smith et al. | |
| 5,691,524 A | 11/1997 | Josephson | |
| 5,697,482 A | 12/1997 | Orus et al. | |
| 5,699,528 A | 12/1997 | Hogan | |
| 5,704,045 A | 12/1997 | King et al. | |
| 5,706,925 A | 1/1998 | Orus et al. | |
| 5,715,298 A | 2/1998 | Rogers | |
| 5,717,868 A | 2/1998 | James | |
| 5,717,989 A * | 2/1998 | Tozzoli et al. | 705/37 |
| 5,727,249 A | 3/1998 | Pollin | |
| 5,729,460 A | 3/1998 | Plett et al. | |
| 5,739,511 A | 4/1998 | Pedersen | |
| 5,740,247 A | 4/1998 | Violante et al. | |
| 5,748,908 A | 5/1998 | Yu | |
| 5,754,655 A | 5/1998 | Hughes et al. | |
| 5,757,917 A | 5/1998 | Rose et al. | |
| 5,761,308 A | 6/1998 | Torii et al. | |
| 5,768,132 A | 6/1998 | Cordery et al. | |
| 5,778,067 A | 7/1998 | Jones et al. | |
| 5,783,808 A | 7/1998 | Josephson | |
| D398,446 S | 9/1998 | Hosea | |
| 5,808,723 A | 9/1998 | Klees | |
| 5,812,945 A | 9/1998 | Hansen et al. | |
| 5,816,174 A | 10/1998 | Smith et al. | |
| 5,819,228 A | 10/1998 | Spiro | |
| 5,819,236 A | 10/1998 | Josephson | |
| 5,819,239 A | 10/1998 | Berson et al. | |
| 5,826,241 A | 10/1998 | Stein et al. | |
| 5,826,247 A | 10/1998 | Pintsov et al. | |
| 5,832,089 A | 11/1998 | Kravitz et al. | |
| 5,832,460 A | 11/1998 | Bednar et al. | |
| 5,842,183 A | 11/1998 | Delfer, III et al. | |
| D403,667 S | 1/1999 | Musha | |
| 5,857,152 A | 1/1999 | Everett | |
| 5,870,456 A | 2/1999 | Rogers | |
| 5,873,072 A | 2/1999 | Kight et al. | |
| D406,574 S | 3/1999 | Eckley et al. | |
| 5,880,454 A | 3/1999 | Monicault | |
| 5,883,810 A | 3/1999 | Franklin et al. | |
| 5,884,288 A | 3/1999 | Chang et al. | |
| 5,890,137 A | 3/1999 | Koreeda | |
| 5,893,902 A | 4/1999 | Transue et al. | |
| 5,893,907 A | 4/1999 | Ukuda | |
| 5,903,880 A | 5/1999 | Biffar | |
| 5,905,976 A | 5/1999 | Mjolsnes et al. | |
| 5,907,832 A | 5/1999 | Pieterse et al. | |
| 5,909,492 A | 6/1999 | Payne et al. | |
| 5,914,472 A | 6/1999 | Foladare et al. | |
| 5,924,084 A | 7/1999 | De Rooij | |
| 5,930,778 A | 7/1999 | Geer | |
| 5,936,219 A | 8/1999 | Yoshida et al. | |
| 5,943,656 A | 8/1999 | Crooks et al. | |
| 5,946,669 A | 8/1999 | Polk | |
| 5,963,921 A | 10/1999 | Longfield | |
| 5,963,924 A | 10/1999 | Williams et al. | |
| 5,963,925 A | 10/1999 | Kolling et al. | |
| 5,966,698 A | 10/1999 | Pollin | |
| 5,970,475 A | 10/1999 | Barnes et al. | |
| 5,973,619 A | 10/1999 | Paredes | |
| 5,974,145 A | 10/1999 | Feiken | |
| 5,974,146 A | 10/1999 | Randle et al. | |

(56) References Cited

U.S. PATENT DOCUMENTS

| | | | |
|---|---|---|---|
| 5,978,780 A | 11/1999 | Watson | |
| 5,978,840 A | 11/1999 | Nguyen et al. | |
| 5,983,207 A | 11/1999 | Turk et al. | |
| 5,983,208 A | 11/1999 | Haller et al. | |
| 5,987,132 A | 11/1999 | Rowney | |
| 5,987,140 A | 11/1999 | Rowney et al. | |
| 5,991,411 A | 11/1999 | Kaufman et al. | |
| 5,991,412 A | 11/1999 | Wissenburgh et al. | |
| 5,995,626 A | 11/1999 | Nishioka et al. | |
| 5,999,625 A | 12/1999 | Bellare et al. | |
| 6,006,199 A | 12/1999 | Berlin et al. | |
| 6,012,048 A | 1/2000 | Gustin et al. | |
| 6,012,740 A | 1/2000 | Lupi | |
| 6,014,646 A | 1/2000 | Vallee et al. | |
| 6,016,484 A | 1/2000 | Williams et al. | |
| 6,016,955 A | 1/2000 | De Rooij et al. | |
| 6,021,943 A | 2/2000 | Chastain | |
| 6,029,150 A | 2/2000 | Kravitz | |
| 6,038,547 A | 3/2000 | Casto | |
| 6,038,548 A | 3/2000 | Kamil | |
| 6,041,315 A | 3/2000 | Pollin | |
| 6,044,362 A | 3/2000 | Neely | |
| 6,047,267 A | 4/2000 | Owens et al. | |
| 6,047,269 A | 4/2000 | Biffar | |
| 6,049,785 A | 4/2000 | Gifford | |
| 6,049,786 A | 4/2000 | Smorodinsky | |
| 6,052,671 A | 4/2000 | Crooks et al. | |
| 6,052,674 A | 4/2000 | Zervides et al. | |
| 6,056,322 A | 5/2000 | Lupi | |
| 6,058,380 A | 5/2000 | Anderson et al. | |
| 6,058,382 A | 5/2000 | Kasai et al. | |
| 6,061,665 A | 5/2000 | Bahreman | |
| 6,062,472 A | 5/2000 | Cheung | |
| 6,065,675 A | 5/2000 | Teicher | |
| 6,070,148 A | 5/2000 | Mori et al. | |
| 6,070,150 A | 5/2000 | Remington et al. | |
| 6,070,798 A | 6/2000 | Nethery | |
| 6,072,870 A | 6/2000 | Nguyen et al. | |
| 6,073,104 A | 6/2000 | Field | |
| 6,073,113 A | 6/2000 | Guinan | |
| 6,073,125 A | 6/2000 | Cordery et al. | |
| 6,076,073 A | 6/2000 | Pieterse et al. | |
| 6,076,074 A | 6/2000 | Cotton et al. | |
| 6,076,075 A | 6/2000 | Teicher | |
| 6,081,790 A | 6/2000 | Rosen | |
| 6,085,169 A | 7/2000 | Walker et al. | |
| 6,102,287 A | 8/2000 | Matyas, Jr. | |
| 6,108,531 A | 8/2000 | Berg et al. | |
| 6,108,644 A | 8/2000 | Goldschlag et al. | |
| 6,109,837 A | 8/2000 | Mausy | |
| 6,115,601 A | 9/2000 | Ferreira | |
| 6,119,107 A | 9/2000 | Polk | |
| 6,122,625 A | 9/2000 | Rosen | |
| 6,125,354 A | 9/2000 | MacFarlane et al. | |
| 6,129,272 A | 10/2000 | Yoshida et al. | |
| 6,135,261 A | 10/2000 | Noell, Jr. et al. | |
| 6,138,907 A | 10/2000 | Mori et al. | |
| 6,148,405 A * | 11/2000 | Liao et al. | 726/2 |
| 6,151,588 A * | 11/2000 | Tozzoli et al. | 705/37 |
| 6,163,771 A | 12/2000 | Walker et al. | |
| 6,167,378 A | 12/2000 | Webber, Jr. | |
| 6,167,385 A * | 12/2000 | Hartley-Urquhart | 705/35 |
| 6,169,974 B1 | 1/2001 | Baumgartner et al. | |
| 6,173,269 B1 | 1/2001 | Solokl et al. | |
| 6,173,272 B1 | 1/2001 | Thomas et al. | |
| 6,178,409 B1 | 1/2001 | Weber et al. | |
| 6,181,361 B1 | 1/2001 | Bluteau et al. | |
| RE37,067 E | 2/2001 | Feiken | |
| 6,185,545 B1 | 2/2001 | Resnick et al. | |
| 6,193,152 B1 | 2/2001 | Fernando et al. | |
| 6,199,107 B1 | 3/2001 | Dujari | |
| 6,202,052 B1 | 3/2001 | Miller | |
| 6,202,054 B1 | 3/2001 | Lawlor et al. | |
| 6,205,433 B1 | 3/2001 | Boesch et al. | |
| 6,205,435 B1 | 3/2001 | Biffar | |
| 6,205,437 B1 | 3/2001 | Gifford | |
| 6,206,285 B1 | 3/2001 | Baitz et al. | |
| 6,216,115 B1 | 4/2001 | Barrameda et al. | |
| 6,222,914 B1 | 4/2001 | McMullin | |
| 6,227,447 B1 | 5/2001 | Campisano | |
| 6,230,148 B1 | 5/2001 | Pare, Jr. et al. | |
| 6,233,565 B1 | 5/2001 | Lewis et al. | |
| 6,304,858 B1 * | 10/2001 | Mosler et al. | 705/37 |
| 6,324,525 B1 | 11/2001 | Kramer et al. | |
| 6,721,716 B1 * | 4/2004 | Gross | 705/40 |
| 8,249,963 B1 * | 8/2012 | Blowers | 705/35 |
| 2001/0011255 A1 | 8/2001 | Asay et al. | |
| 2001/0047273 A1 | 11/2001 | Greer et al. | |
| 2002/0038277 A1 * | 3/2002 | Yuan | 705/37 |
| 2002/0095355 A1 * | 7/2002 | Walker et al. | 705/26 |
| 2002/0161704 A1 * | 10/2002 | Powar | 705/40 |
| 2003/0093367 A1 * | 5/2003 | Allen-Rouman et al. | 705/39 |
| 2003/0115111 A1 * | 6/2003 | Fisher | 705/26 |
| 2003/0126075 A1 * | 7/2003 | Mascavage et al. | 705/39 |
| 2003/0130959 A1 | 7/2003 | Rosenbaum | |
| 2004/0010463 A1 | 1/2004 | Hahn-Carlson et al. | |
| 2004/0015436 A1 * | 1/2004 | Understein | 705/39 |
| 2004/0078328 A1 * | 4/2004 | Talbert et al. | 705/40 |
| 2004/0128240 A1 * | 7/2004 | Yusin | 705/39 |
| 2005/0027654 A1 * | 2/2005 | Adrian | 705/40 |
| 2005/0144130 A1 * | 6/2005 | Staniar et al. | 705/40 |
| 2005/0283416 A1 * | 12/2005 | Reid et al. | 705/35 |
| 2005/0283430 A1 * | 12/2005 | Reid et al. | 705/39 |
| 2005/0283431 A1 * | 12/2005 | Reid et al. | 705/39 |
| 2005/0283432 A1 * | 12/2005 | Reid et al. | 705/39 |
| 2005/0283433 A1 * | 12/2005 | Reid et al. | 705/39 |
| 2007/0106604 A1 * | 5/2007 | Van Rensburg et al. | 705/39 |
| 2007/0174191 A1 * | 7/2007 | Keaton et al. | 705/40 |
| 2008/0010194 A1 * | 1/2008 | Thomas | 705/39 |

FOREIGN PATENT DOCUMENTS

| | | |
|---|---|---|
| WO | WO 01/33522 A1 | 5/2001 |
| WO | WO 01/57770 A1 | 8/2001 |
| WO | WO 03/038553 A2 | 5/2003 |

OTHER PUBLICATIONS

US 5,351,994, 10/2004, Polin (withdrawn).
U.S. Appl. No. 10/020,466, Vaux et al.
U.S. Appl. No. 11/034,667, Reid et al.
U.S. Appl. No. 11/131,602, Reid et al.
U.S. Appl. No. 11/131,605, Reid et al.
U.S. Appl. No. 11/131,679, Reid et al.
U.S. Appl. No. 11/132,102, Reid et al.

* cited by examiner

|  | Transaction Fee Term #1 | Transaction Fee Term #2 | Transaction Fee Term #3 |
|---|---|---|---|
| Issuer ID | 1234 | 5678 | 9012 |
| Buyer ID | 95 | 18 | --- |
| Hamilton account (or alias) | 121212 | --- | --- |
| Supplier ID | 22 | 22 | --- |

METHOD AND SYSTEM FOR PROVIDING ASSURANCE AND FINANCING SERVICES

CROSS-REFERENCE TO RELATED APPLICATIONS

This application claims priority from co-pending U.S. Provisional Patent Application No. 60/581,021 filed Jun. 17, 2004 entitled METHOD AND SYSTEM FOR PROVIDING ASSURANCE AND FINANCING SERVICES which is hereby incorporated by reference, as if set forth in full in this document, for all purposes.

BACKGROUND OF THE INVENTION

The present invention generally relates to assurance and financing services, and more specifically, to a method and system for providing assurance and financing services to buyers and sellers involved in commercial transactions.

In business-to-business transactions, buyers and sellers can establish relationships with one another in a number of different ways. For example, when the transactional volume and/or amount reaches a certain level, a buyer and a seller typically enter into a sales agreement to minimize the risks of exposure and breach by either party. In addition, when a buyer and a seller wish to establish a long-term relationship with one another, they also typically enter into a sales agreement which includes the terms and conditions which govern the rights and obligations of the parties whenever they deal with each other, thereby avoiding the need to negotiate terms and conditions for each transaction on an ad hoc basis.

While sales agreements are routinely used by buyers and sellers to establish contractual relationships with one another, the terms and conditions of a sales agreement typically still need to be reviewed and applied to each transaction manually. In other words, even when a buyer and a seller have established a long-term contractual relationship via execution of a sales agreement, whenever a transaction is to be completed between the parties, both parties still need to manually ensure that the transaction is compliant with the terms and conditions of the sales agreement. The examination of the terms and conditions of the sales agreement is usually done by a human being on an individual basis for each transsection. This manual examination process is often tedious, time-consuming and prone to errors. Therefore, it would be desirable to have a system which is capable of storing and applying in an automated manner the terms and conditions of a sales agreement between a buyer and a seller for transactions conducted between the parties.

Furthermore, a buyer and a seller may have more than one sales agreement between the parties. In fact, as between a buyer and a seller who have a long-term relationship, various types of sales agreements often exist and apply to different types of transactions between the parties. Manually reviewing these various types of sales agreements to determine which specific sale agreement applies to a particular transaction is obviously inefficient. Therefore, it would also be desirable to have a system which is capable of collectively storing and maintaining terms and conditions of sales agreements between a buyer and a seller.

A transaction between a buyer and a seller is typically completed in the following manner. A buyer usually issues a purchase order to a seller for goods and/or services which the buyer wishes to purchase. Upon receipt of the purchase order, the seller ships the goods to the buyer. The seller generally simultaneously forwards an invoice for the amount due when the goods are shipped. It is up to the buyer to honor that invoice and pay within an agreed upon period of time. Payment by the buyer is typically made via check or money transfer. Alternatively, payment can also be made via credit cards or similar credit arrangements.

A normal credit card transaction involves a number of parties, including a buyer who possesses a credit card, a seller, an acquirer, an issuer and a credit card association such as Visa or Mastercard. The acquirer is a business entity, e.g., a commercial bank, that has a business relationship with the seller and receives all the credit card transactions from that seller. The issuer is a business entity which issues the credit card to the buyer. The credit card association such as Visa maintains a network of processing applications, e.g., VisaNet, which facilitates issuance of credit cards and processing of credit card transactions.

A typical credit card transaction involves the following steps. First, the seller calculates the amount of the transaction or purchase and seeks payment from the buyer. The buyer then presents the seller with his/her credit card. The seller then runs the credit card through a point of sale terminal. The point of sale terminal captures credit card and sales information and sends such information together with an authorization request to the acquirer. The acquirer, in turn, processes the information received from the point of sale terminal and forwards any relevant information and the authorization request to the issuer. The issuer processes the relevant information and the authorization request to determine whether the transaction should be authorized. The issuer then sends an approval or denial code back to the acquirer. The acquirer relays the approval or denial code to the point of sale terminal for use by the seller. If the transaction is authorized, the buyer is allowed to consummate the transaction with the seller. Typically, at a later time, the accounts maintained by the issuer and the acquirer are settled and reconciled. The issuer transfers the transaction amount minus a fee to the acquirer. The acquirer then deducts a fee from the amount received from the issuer. The remaining amount is then transferred by the acquirer to the seller's account. A separate fee is charged by the credit card association for use of its network to facilitate the transaction.

Credit card transactions are generally well accepted. Computer systems have been developed to process these transactions in a reliable and secure manner. One such computer system known as VisaNet is developed by Visa to process credit card transactions. Therefore, it would be desirable to have a system which is capable of taking advantage of currently available computing resources thereby further expediting and facilitating transactions between buyers and sellers.

SUMMARY OF THE INVENTION

A system for conducting a commercial transaction between a buyer and a seller is disclosed. The system includes a transaction processing system for facilitating payment for a transaction between the buyer and the seller. In addition to the buyer and the seller, the transaction processing system also interacts with an issuer, an acquirer and a credit card association, such as Visa (via VisaNet). The issuer issues and manages an account for the buyer. The acquirer manages an account for the seller.

Before the transaction processing system is used to process transactions between the buyer and the seller, certain information is obtained from the buyer, the seller, the issuer and the acquirer and stored on the system. Each buyer and seller are registered in the system. Upon registration, the pre-negotiated terms and conditions which are to be used to govern the transactions between the buyer and the seller are collected and stored on the system. Such terms and conditions are obtained, for example, from a sales agreement between the buyer and the seller. In addition, the system also stores pre-negotiated terms and conditions agreed to amongst the buyer, the seller, the issuer and the acquirer.

The transaction processing system handles a transaction between a buyer and a seller in the following exemplary manner. An electronic invoice is first posted to the system by the seller or another system. Upon accepting the electronic invoice, the system creates one or more payment instructions. Each payment instruction corresponds to a payment transaction. Typically, one invoice represents one payment transaction, and hence, one payment instruction is created. However, it should be understood that multiple payment instructions may be created from a single invoice because a single invoice may represent multiple payment transactions. Alternatively, the buyer can cause the system to create a payment instruction without a corresponding electronic invoice.

Each time a payment instruction is created, the system applies some or all of the previously stored pre-negotiated payment terms and conditions between the buyer and the seller to the payment instruction. For example, if terms for a given buyer-seller contract state that payment is due 45 days from invoice date, that information would be included in the payment instruction when the payment instruction is created.

After a payment instruction is created, the system seeks approval from the buyer. The approval can be provided by the buyer through an interface to the system. Alternatively, the approval can be supplied by a third party system on behalf of the buyer. Upon approval of a payment instruction by the buyer, the system schedules the payment for the specified date in the payment instruction. On the scheduled day of payment, the system calculates one or more fees, such as a transaction fee, for that particular payment transaction according to a pre-defined variable pricing matrix, which is determined based on the set of pre-negotiated terms and conditions agreed to by the issuer, the acquirer, the seller and the buyer.

The transaction fee is an amount used by the issuer and the acquirer to compensate each other for processing the payment transaction on behalf of the buyer and the seller. The respective portions of the transaction fee to be received by the issuer and the acquirer may vary. For example, the transaction fee may be shared by the issuer and the acquirer equally or based on some predetermined percentage, or alternatively, the transaction fee may belong solely to the issuer. After the transaction fee is calculated, information relating to the transaction fee and the payment instruction is formatted into a proper message format(s) and submitted for authorization, clearing and settlement. The issuer and the acquirer then communicate with one another directly or indirectly to settle the funds. Additionally, the system provides transaction and activity reports to all relevant parties as well as access to status information for invoices and payments.

Accordingly, in an exemplary embodiment, a system for executing a payment transaction between a buyer and a seller, comprises: a first interface configured to allow invoices to be submitted for payment; a second interface configured to allow the buyer to receive and approve invoices and create and approve payment instructions; and a transaction processing module configured to handle buyer account(s) and seller account(s) respectively, the transaction processing module is further configured to store a plurality of conditions relating to the buyer, the seller, an issuer and an acquirer; and wherein the transaction processing module enables the issuer and the acquirer to process the invoices in accordance with the plurality of conditions.

Accordingly, in another exemplary embodiment, a method for processing a payment transaction between a buyer and a seller, comprises: maintaining a buyer account and a seller account for the buyer and the seller respectively; maintaining a plurality of terms and conditions relating to the buyer, the seller, an issuer and an acquirer; approving the payment transaction for payment out of the buyer account; determining a transaction fee for the payment transaction based on the plurality of terms and conditions; calculating a net amount using the transaction fee; obtaining payment authorization for the payment transaction from the issuer; and settling the payment transaction between the issuer and the acquirer.

In one exemplary embodiment, the transaction processing system further includes a number of additional features including, for example, buyer payment assurance, buyer bank payment assurance, buyer bank payable discounting, buyer bank payable discount aggregation, seller/receivable financing and seller bank receivable discount aggregation.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
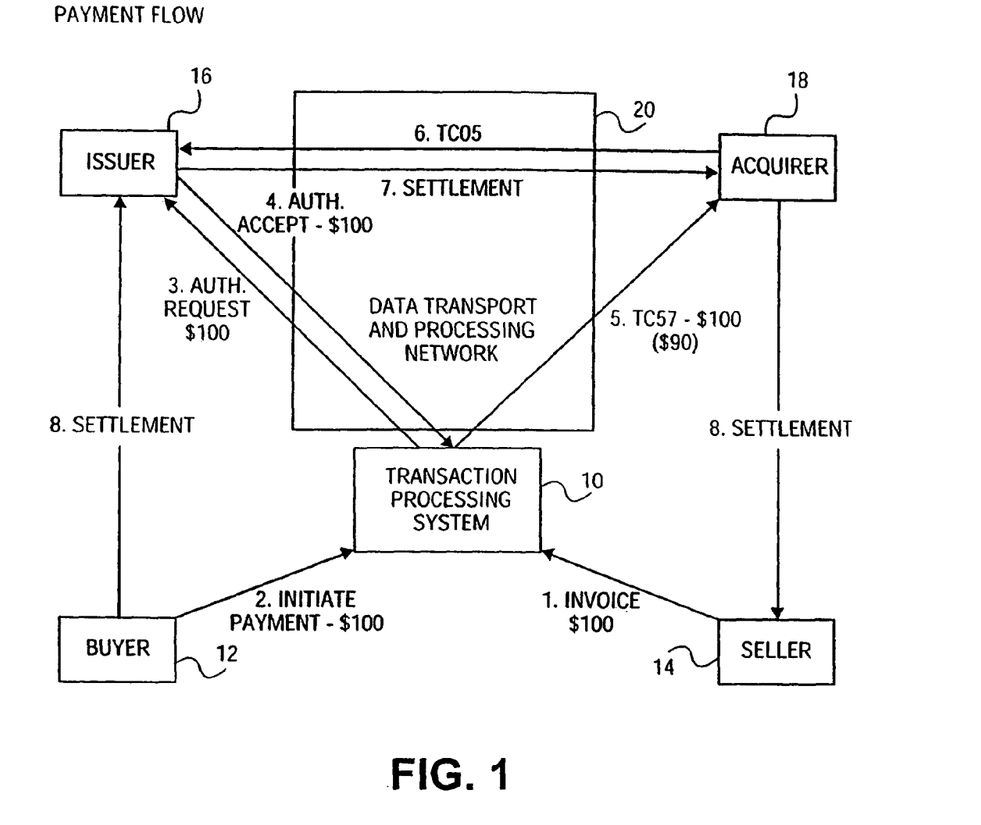
FIG. 1 is a simplified schematic diagram illustrating the process interaction of an exemplary embodiment of the present invention.

The present invention in the form of one or more exemplary embodiments will now be described. Referring to FIG. 1, there is shown the process interaction of an exemplary embodiment of the present invention. According to this exemplary embodiment, a transaction processing system 10 is designed to interact with a number of different parties involved in a transaction including, a buyer 12, a seller 14, an issuer 16, an acquirer 18 and a credit card association, such as Visa (via VisaNet). The buyer 12 can be a person or business entity which has contracted with the seller 14 to purchase goods and/or services.

Similarly, the seller 14 can be a person or business entity which has established a relationship with the buyer 12 to provide goods and/or services to the buyer 12. Such relationship is typically established via a written contract or agreement. For example, the buyer 12 may enter into a contract with the seller 14 on a long-term basis to have the seller 12 be the exclusive provider of office supplies or other commodities for the buyer 12. The relationship between the buyer 12 and the seller 14 will be explained further below.

The issuer 16 can be a business entity which typically is a financial institution such as a bank. The issuer 16 issues one or more transaction accounts to the buyer 12 and is responsible for maintaining and handling the transaction account activities of the buyer 12 in cooperation with the transaction processing system 10. It should be noted that the issuer 16 may issue and maintain transaction accounts for multiple buyers 12.

Similarly, the acquirer 18 can also be a business entity which typically is a financial institution such as a bank. The acquirer 18 is contracted with the seller 14 to accept seller sales drafts and instructions relating to the transaction accounts issued by issuer 16. Furthermore, the acquirer 18 also maintains one or more transaction accounts for the seller 14 and is responsible for maintaining and handling the transaction account activities of the supplier 14 in cooperation with the transaction processing system 10. The acquirer 18 may also maintain similar accounts for multiple sellers 14.

Generally, the transaction processing system 10 stores and manages transaction accounts for buyers 12 and sellers 14 respectively. It should be understood that a single buyer 12 or seller 14 may have multiple transaction accounts from which payment can be debited and/or credited. In addition, the transaction processing system 10 stores and maintains terms and conditions relating to those transaction accounts. These terms and conditions are usually provided to the transaction processing system 10 at the time of registration of the buyer 12 and/or the seller 14. These terms and conditions include, for example, pre-negotiated payment terms and conditions between the buyer 12 and the seller 14, which are to be used to govern transactions between the parties and can be obtained from various sources, such as a sales agreement between the buyer 12 and the seller 14. As will be further explained below, these terms and conditions are selectively used to process the transactions between the buyer 12 and the seller 14.

The transaction processing system 10 also provides the capability to store information relating to the issuers 16 and the acquirers 18. Such information can be used to determine the appropriate amount of transaction fee to be used by the issuer 16 and the acquirer 18 to compensate each other.

Furthermore, the transaction processing system 10 also allows the issuer 16 and the acquirer 18 to create and maintain buyer and seller transaction accounts respectively. In order for the transaction processing system 10 to handle a transaction for the buyer 12 and the seller 14, both the buyer 12 and the seller 14 need to be registered or otherwise have their respective transaction accounts established with the transaction processing system 10. Additional details of the transaction processing system 10 will be further explained below.

The transaction processing system 10 operates in the following exemplary manner. The processing of a single invoice is illustrated below. However, it should be understood that multiple invoices can be processed by the transaction processing system 10 at the same time. As a preliminary step (not shown in FIG. 1), when the buyer 12 decides to purchase goods and/or services from the seller 14, the buyer 12 typically issues a purchase order, or via some other means communicates the purchase order, to the seller 14. Upon receiving the purchase order, the seller 14 then ships the ordered goods or provides a service to the buyer 12.

Referring now to FIG. 1, after receiving the purchase order, the seller 14 issues an electronic invoice either directly or indirectly through a complementary system (e.g., an e-procurement system) to the transaction processing system 10. In an exemplary embodiment, the transaction processing system 10 includes an interface which allows invoices to be posted directly by the seller 14 to the transaction processing system 10.

Upon accepting the invoice, the transaction processing system 10, in turn, creates one or more payment instructions. Each payment instruction corresponds to a payment transaction. Typically, one invoice represents one payment transaction, and hence, one payment instruction is usually created for each invoice. However, it should be understood that multiple payment instructions may be created from a single invoice because a single invoice may represent multiple payment transactions. The payment instruction includes payment terms and conditions between the buyer 12 and the seller 14 which are previously stored on the transaction processing system 10 and relevant to that particular payment transaction. Alternatively, the buyer 12 can cause a payment instruction to be generated by the transaction processing system 10 without any accompanying invoice.

After the payment instruction is created, the transaction processing system 10 seeks approval for that payment instruction from the buyer 12. The approval can be provided by the buyer 12 through an interface to the transaction processing system 10. Alternatively, the approval can be supplied by a third party system on behalf of the buyer 12. Upon approval of the payment instruction by the buyer 12, the transaction processing system 10 schedules the payment for the specified date in the payment instruction.

On the scheduled day of payment, the transaction processing system 10 initiates processing of a payment from a transaction account belonging to the buyer 12 pursuant to the payment instruction.

Upon initiation of processing of the approved payment instruction, the transaction processing system 10 first determines one or more fees, such as a transaction fee, for that particular payment transaction. The transaction fee is an amount used by the issuer 16 and the acquirer 18 to compensate each other for processing the payment transaction. The amount of the transaction fee is determined based on terms and conditions previously agreed to amongst the buyer 12, the seller 14, the issuer 16 and the acquirer 18. Furthermore, the respective portions of the transaction fee to be received by the issuer 16 and the acquirer 18 may vary depending on the arrangement agreed to between the issuer 16 and the acquirer 18. Determination of the transaction fee and these terms and conditions will be further explained below.

Using the transaction fee and other specified fees, if any, the transaction processing system 10 then calculates the net amount to be received by the seller 14 for the payment transaction being processed. Calculation of the net amount will be further described below.

The transaction processing system 10 also prepares an authorization request which is forwarded to the issuer 14 via a data transport and processing network 20, such as VisaNet.

Once the authorization request is approved by the issuer 14, an authorization response is sent by the issuer 14 to the transaction processing system 10. Upon receipt of the authorization response, the transaction processing system 10 forwards a settlement file to the acquirer 18 via the data transport and processing network 20. The settlement file includes, among other information, the invoice amount (gross amount), the transaction fee and the net amount (the gross amount minus the transaction fee and other specified fees, if any).

After the settlement file is received by the acquirer 18, the acquirer 18 issues a request for the transfer of finds. The settlement of funds is then sent from the issuer 16 to the acquirer 18. This settlement of funds between the issuer 16 and the acquirer 18 typically occurs within the data transport and processing network 20. The settlement of funds also occurs between the buyer 12 and the issuer 16 and between the seller 14 and the acquirer 18. More specifically, the buyer 12 forwards or credits the payment amount (or consolidated payments) to the issuer 16 to cover for payment and processing of the payment transaction by the issuer 16 and the acquirer 18 credits the net amount to the seller 14. The settlement of funds between the buyer 12 and the issuer 16 and between the seller 14 and the acquirer 18 occurs outside of the transaction processing system 10.

As shown in FIG. 1, in an exemplary embodiment, the transaction processing system 10 interacts with the data transport and processing network 20 in order to carry out certain payment processing, authorization and/or settlement functions. The data transport and processing network 20 globally connects the processing systems for all participating issuers 16 and acquirers 18. As previously mentioned, an example of the data transport and processing network 20 is VisaNet.

Figure 2:
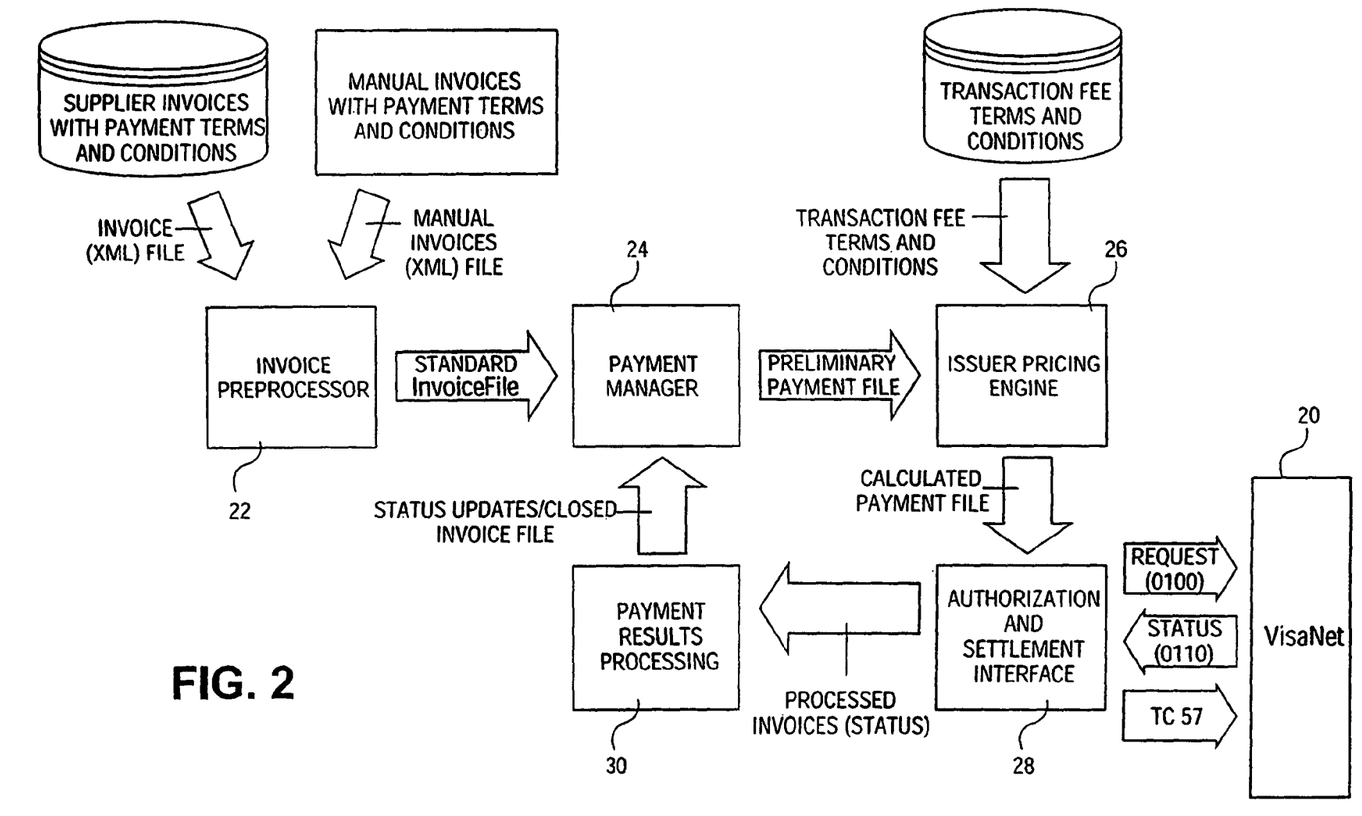
FIG. 2 is a simplified schematic diagram illustrating an exemplary embodiment of the transaction processing system in accordance with the present invention.

Referring to FIG. 2, there is shown an exemplary embodiment of the transaction processing system 10. According to this exemplary embodiment, the transaction processing system 10 includes five components, namely, an invoice pre-processor 22, a payment manager 24, an issuer pricing engine 26, an authorization and settlement interface 28 and a payment results manager 30. Preferably, these five components are implemented in a modular manner; however, it should be understood that they can be implemented in an integral manner as well.

It should also be understood that these five components are provided for illustrative purposes only. The transaction processing system 10 may include any number of components which collectively provide the functionality described herein.

The invoice pre-processor 22 manages input of seller invoices and consolidates these invoices into a standard file format. The invoice pre-processor 22 is capable of accepting seller invoices in an electronic format. Alternatively, the invoice pre-processor 22 may receive invoice data which is manually inputted.

In addition, it should be understood that the term "invoice" as used herein includes a typical invoice and any payment request pursuant to which an amount is to be paid from the buyer 12 to the seller 14. An invoice does not necessarily need to originate from the seller 14 but may be originated from a third party system which issues the invoice on behalf of the seller 14. The buyer 12 cannot create an invoice, but can cause a payment instruction to be created without having received an invoice.

In any event, the invoice pre-processor 22 generates a standardized invoice file which is then forwarded to the payment manager 24. In an exemplary implementation, the invoice pre-processor 22 combines all seller invoices into one standard file to be delivered as input into the payment manager 24.

The payment manager 24 receives the standardized invoice file from the invoice pre-processor 22 and processes the standardized seller invoices. For each invoice, the payment manager 24 creates a corresponding payment instruction. The payment instruction includes certain pre-negotiated payment terms and conditions, if any, between the buyer 12 and the seller 14 which are relevant to the corresponding payment transaction. Alternatively, the buyer 12 can cause a payment instruction to be generated without any accompanying invoice. For example, the pre-negotiated payment terms and conditions may include payment timing information such as 2/10/net 30, etc. Other information can also be included to indicate that payments over a certain amount must be paid faster, or certain types of goods can be paid over a longer period of time, etc. In other words, this enables the buyer 12 to reference important contract terms that do not relate directly to calculating the transaction fee. If no specific set of terms or conditions exists for that particular invoice or payment transaction, then a default set of terms and conditions may be used. It should be noted that the payment manager 24 may contain default sets of terms and conditions for various different buyers 12, sellers 14, issuers 16 and acquirers 18.

After the payment instruction is created, the payment manager 24 seeks approval for that payment instruction from the buyer 12. The approval can be provided by the buyer 12 via an interface to the payment manager 24, or alternatively, the approval can be supplied by a third party system on behalf of the buyer 12. In any event, upon approval of the payment instruction by the buyer 12, the payment manager 24 schedules the payment for the specified date in the payment instruction. On the scheduled day of payment, the payment manager 24 invokes the issuer pricing engine 26 to process the payment transaction, as will be described further below.

The payment manager 24 keeps track of the status of each invoice or payment transaction. Each invoice or payment transaction may assume one of a number of status. A "scheduled" invoice is an invoice which is scheduled for payment on a particular due date. A "pending" invoice is an invoice for which an authorization request has already been issued. A "declined" invoice is an invoice which has been refused by the issuer 16. An "authorized" invoice is an invoice which has been approved by the issuer 16. Finally, a "settled" invoice is an invoice for which settlement fund has already taken place. The payment manager 24 cooperates with the payment results processor 30 to update the status of each pending invoice or payment transaction.

The payment manager 24 further provides various functions and services to the buyer 12, the seller 14, the issuer 16 and the acquirer 18.

With respect to the buyer 12, the payment manager 24 allows the buyer 12 to perform a number of tasks, including, for example, (1) administering users belonging to the buyer 12, such as controlling user access levels and roles with identity authentication; (2) viewing and printing a listing of open invoices; (3) viewing payment terms and conditions for sellers presenting the invoices; (4) approving or rejecting invoices; (5) selecting invoices to pay from list of open invoices; (6) viewing payment status of invoices; (6) creating a payment for a seller if there is no associated invoice; (8) entering or selecting payment variables, such as amount, disbursement account and date, including scheduling in advance for deferred settlement; (9) defining and enforcing payment approval process and authorization levels; (10) placing payments on hold or canceling payments; (11) viewing historical invoice or payment transactions; and (12) downloading invoice or payment data.

With respect to the seller 14, the payment manager 24 allows the seller 14 to create invoices and view the status of relevant invoices and payments.

With respect to the acquirer 18, the payment manager 24 allows the acquirer 18 to create accounts for sellers 14 and their respective users.

With respect to the issuer 16, the payment manager 24 permits the issuer 16 to perform the following exemplary functions, including, for example, (1) entering payment account information for each buyer 12; (2) providing customer service to the buyer 12; and (3) creating accounts for additional buyers 12 and their respective users.

As mentioned above, on the scheduled day of payment, the payment manager 24 invokes the issuer pricing engine 26 to process the payment transactions. More specifically, the issuer pricing engine 26 is invoked to determine one or more fees, such as a transaction fee, associated with each payment transaction. These fees may be pre-negotiated amongst and/or between the various parties including the issuer 16, the acquirer 18, the buyer 12 and the seller 14. For example, the transaction fee is based on several parameters defined among the issuer 16, the acquirer 18, the buyer 12 and the seller 14. These parameters are collectively known as the "Transaction Fee Terms and Conditions." The transaction fee is used by the acquirer 18 and the issuer 16 to compensate each other for each payment transaction. The respective portions of the transaction fee to be received by the issuer 16 and the acquirer 18 may vary depending on the arrangement agreed to between the issuer 16 and the acquirer 18. For example, the issuer 16 and the acquirer 18 may agree with each other to split the transaction fee based on a pre-negotiated percentage, such as 50-50; alternatively, the issuer 16 may be entitled to receive the entire transaction fee.

The Transaction Fee Terms and Conditions are negotiated between several parties, including, for example, (1) the buyer 12 and the seller 14; (2) the issuer 16 and the buyer 12; (3) the acquirer 18 and the seller 14; and (4) the issuer 16 and the acquirer 18. The issuer 16 is preferably responsible for defining, entering and maintaining the Transaction Fee Terms and Conditions using the payment manager 24. The Transaction Fee Terms and Conditions are stored in the issuer pricing engine 26 or another database and are accessible to the relevant parties.

Figure 3:
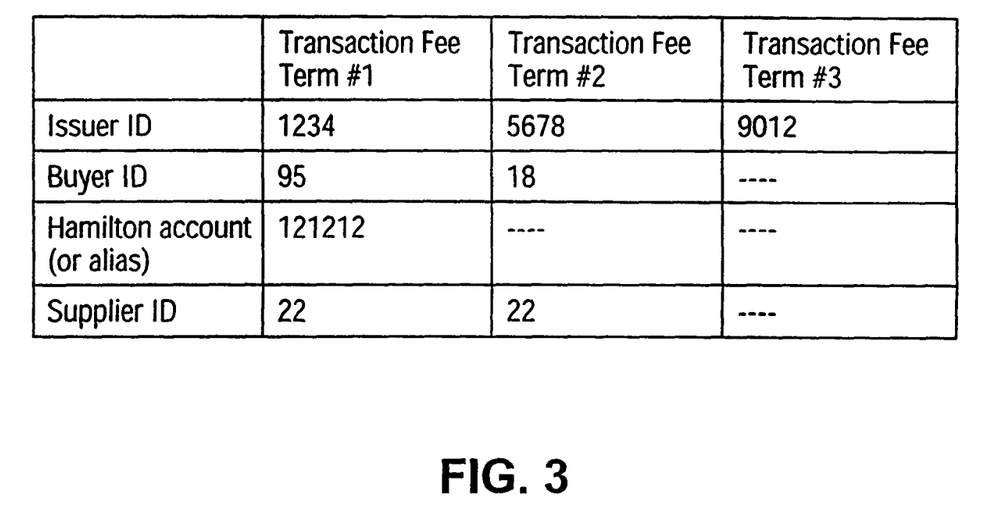
FIG. 3 is a diagram illustrating examples of the Transaction Fee Terms and Conditions.

FIG. 3 is a diagram illustrating examples of the Transaction Fee Terms and Conditions. As shown in FIG. 3, for example, Transaction Fee Term #3 applies to every payment transaction for Issuer #9012. For Issuer #1234, Transaction Fee Term #1 only applies if a payment transaction is made between Buyer #95 and Seller #22 using account #121212. For Issuer #5678, since no account is specified, Transaction Fee Term #2 applies to every payment transaction between Buyer #18 and Seller #22. Other examples of the Transaction Fee and Terms and Conditions include a set of five transaction size ranges that apply to a hierarchy of relationships. The set of transaction size ranges may be payments between $0-$500, $501-$1000, $1001-$5000, etc. These ranges can be established by the parties involved. For example, an individual matrix can be established for (1) each buyer and seller relationship, (2) for all sellers to a certain buyer, (3) for all sellers with a relationship to a certain acquirer, etc. Other Transaction Fee and Terms and Conditions may include additional fees for new value added services such as guaranteed payment.

The net amount for each payment transaction is then calculated by subtracting the transaction fee from a gross amount. The gross amount represents the payment amount which is to be paid by the buyer 12 for the payment transaction being processed. Optionally, additional fees may be deducted from the net amount. For example, the acquirer 18 may require the seller 14 to pay other fees in order for the acquirer 18 to handle certain payment transactions on behalf of the seller 14.

Figure 4:
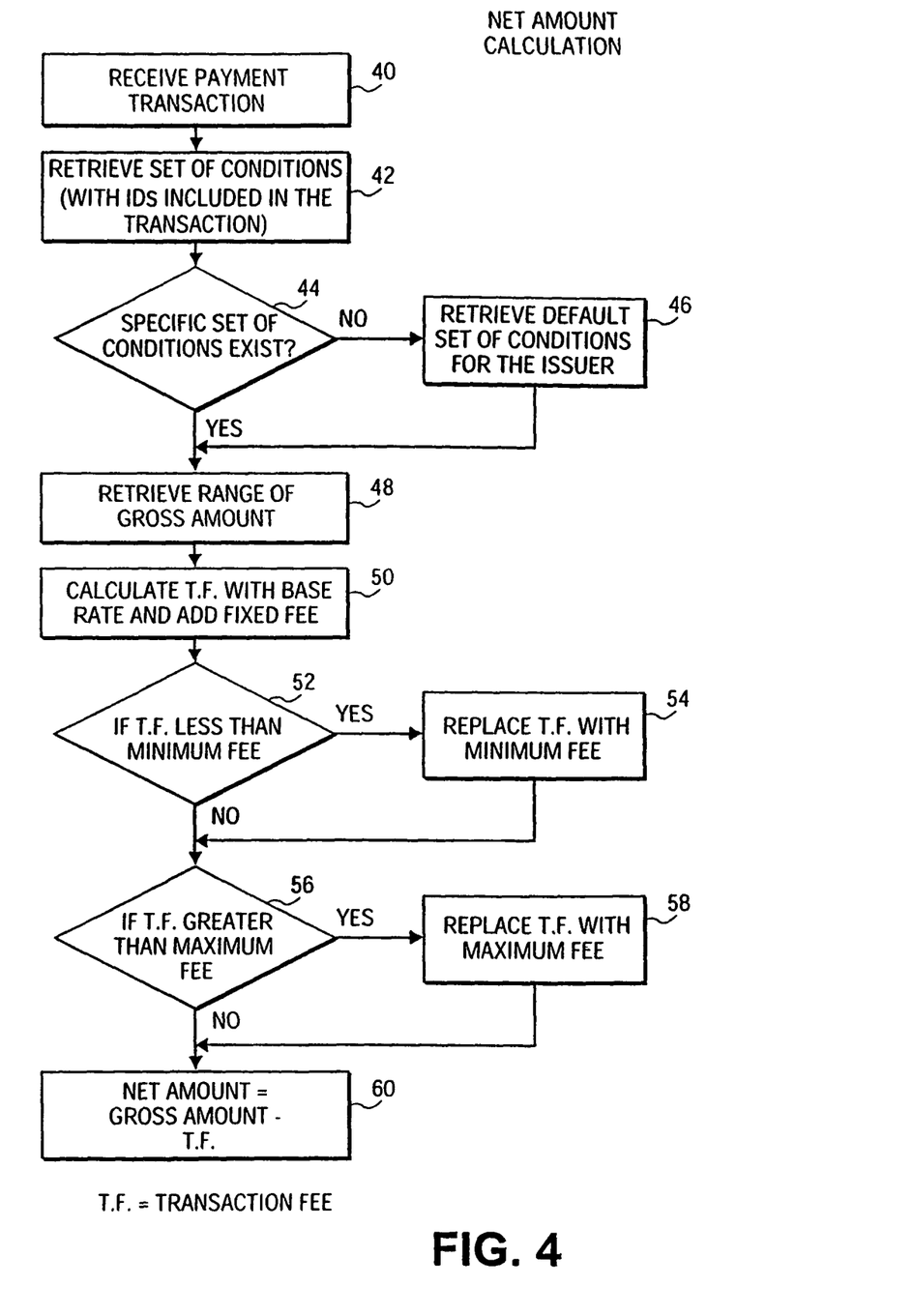
FIG. 4 is a flow diagram illustrating how the net amount for each transaction is calculated in accordance with am exemplary embodiment of the present invention.

FIG. 4 is a flow diagram illustrating how the issuer pricing engine 26 calculates the net amount for each payment transaction. At 40, the issuer pricing engine 26 receives the payment instruction corresponding to the payment transaction to be processed from the payment manager 24. At 42, the issuer pricing engine 26 attempts to retrieve a specific set of terms and conditions associated with that particular payment transaction for use in calculating the transaction fee. At 44, if a specific set of terms and conditions does not exist, a default set of terms and conditions may be retrieved at 46. In any event, the set of terms and conditions include information, such as pricing parameters, which is used to calculate the transaction fee.

At 48, for example, the transaction size ranges and their associated pricing factors are obtained from within the retrieved set of terms and conditions. Each range may have different pricing factors. For example, the pricing factor for the range of $0-$500 may be a basis rate which is based purely on percent calculation, such as 1.5% of the gross amount; the pricing factor for the range of $501 to $632 may be 1% of the gross amount plus a flat fee of $5; the pricing factor for the range of $633 to $999 may be purely a flat fee, etc. At 50, the transaction fee is calculated by applying the appropriate pricing factor against the gross amount. As described above, the pricing factor may include a basis rate or percentage only, flat fee only or combination of the two with specific and defined values. It should be understood that other formulations or criteria may be used as the appropriate pricing factor.

At 52, the issuer pricing engine 26 determines whether the transaction fee is less than a minimum fee. The minimum fee is part of the negotiated fees in the variable pricing negotiation between issuers, acquirers, etc. At 54, if it is determined that the transaction fee is less than the minimum fee, then the minimum fee is used as the transaction fee.

At 56, the issuer pricing engine 26 further determines whether the transaction fee exceeds a maximum fee. The maximum fee is also part of the negotiated fees in the variable pricing negotiation between issuers, acquirers, etc. If the transaction fee exceeds the maximum fee, then, at 58, the maximum fee is used as the transaction fee. At 60, the net amount is calculated by subtracting the transaction fee from the gross amount. For each payment transaction, the gross amount is the payment amount to be paid by the buyer 12, the transaction fee is the amount used by the acquirer 18 and the issuer 16 to compensate each other. The net amount is the amount to be received by the seller 14. Optionally, other fees may be deducted from the net amount. For example, the acquirer 18 may require the seller 14 to pay additional fees for processing of certain specified payment transactions.

Once the relevant amounts, such as the transaction fee and the net amount, are calculated, they are consolidated with other information into a calculated payment file for delivery to the authorization and settlement interface 28. The calculated payment file is stored on an archive database or other storage medium for archival and reporting purposes.

The authorization and settlement interface 28 is responsible for transmitting and receiving payment transaction authorization and/or settlement information to and from the data transport and processing network 20. For each payment transaction, the data transport and processing network 20 determines whether such transaction is authorized (by the issuer 16). Authorization and/or settlement results are then provided to the authorization and settlement interface 28.

The payment results manager 30 then receives the authorization and/or settlement results from the authorization and settlement interface 28 and further processes the results. The processed results are then passed back to the payment manager 24. The payment manager 24 then updates the status of the invoices or payment transactions and allows users to see whether payments for invoices have been settled or have been declined.

In an exemplary embodiment, the transaction processing system 10 is implemented on a server which is accessible via a computer network, such as the Internet. Based on the disclosure provided herein, a person of ordinary skill in the art will know of ways and methods to implement the transaction processing system 10 on a server or other configuration.

Furthermore, in order to facilitate access by various users, the transaction processing system 10 also includes a number of user interfaces. The user interfaces allow different users to view and/or modify different information or data residing on the transaction processing system 10 depending on the access authority of such users. For example, an issuer 16 via a user interface may be able to view and modify certain Transaction Fee Terms and Conditions relating to its buyers 12. A buyer 12 via another user interface may be able to view invoices issued by its sellers 14. A person of ordinary skill in the art will know of other ways and methods to implement user interfaces via a computer network which allow information and data to be accessed.

In one exemplary embodiment, the transaction processing system 10 further includes a number of additional features including, for example, buyer payment assurance, buyer bank payment assurance, buyer bank payable discounting, buyer bank payable discount aggregation, seller/receivable financing and seller bank receivable discount aggregation, each of which will be further described below. In connection with some of these additional features, the transaction processing system 10 also allows interactions and participation by other entities including, for example, a buyer bank and a seller bank.

In one exemplary aspect, the transaction processing system 10 provides buyer payment assurance in that a buyer 12 has the ability to provide unconditional, irrevocable assurance (guarantee) that a payment will be made on a specified date with certainty. As described above, the transaction processing system 10 provides the opportunity to a buyer 12 to approve a payment instruction. During this approval process, the buyer 12 has the option to specify that s/he desires to assure payment. Terms and conditions relating to payment assurance are pre-negotiated and stored in the transaction processing system 10. For example, a buyer 12 may agree to assure payment using a funding source, such as, a checking account maintained at a buyer bank. In one situation, the buyer bank and the issuer 16 may be the same entity maintaining both a checking account and a credit card account for the buyer 12. Information relating to the funding source can be provided and maintained in the transaction processing system 10.

Optionally, the buyer 12 may also specify a date in connection with the payment assurance indicating that payment will be made on or before the specified date. Upon providing a specified date, the transaction processing system 10 informs the buyer 12 of settlement timeframes. For example, the buyer 12 can be informed that payments that are settled in U.S. dollars will post to a seller bank clearing account within one (1) business day of the payment due date and non-U.S. dollar transactions will post to a seller bank clearing account within two (2) business days of the payment due date.

Upon the buyer 12 indicating that a transaction is to be buyer-assured, the transaction processing system 10 "locks down" that particular transaction and its corresponding payment instruction, i.e., information relating to the transaction and the corresponding payment instruction is protected against any subsequent modifications. In addition, optional notification can be provided by the transaction processing system 10 to the buyer 12, the seller 14, the buyer bank and the seller bank regarding the buyer-assured status of the transaction. Should it be subsequently decided that the transaction is to be reversed, the reversal process is performed outside of the transaction processing system 10.

The transaction processing system 10 further allows transactions with buyer-assured status to be identified. Information relating to such transactions can then be provided to the seller 14 and/or the seller bank for reporting purposes. Such information can then be used by the seller bank to provide financing services. For example, using the information, the seller bank is able to flag transactions that it has provided factoring for. This enables the seller bank to recognize which transactions are financed so that credit for these transactions will not be passed onto the seller. Use of this information will be further described below.

In one exemplary aspect, the transaction processing system 10 enables a buyer 12 to request and/or obtain buyer bank assurance from a buyer bank. Buyer bank assurance means that the buyer bank has agreed to guarantee payment for the transaction. During the payment instruction approval process, the buyer 12 is able to issue a request for buyer bank assurance. Terms and conditions relating to the buyer bank assurance are pre-negotiated between the buyer 12 and the buyer bank. In one embodiment, such terms and conditions are stored in and used by the transaction processing system 10 to process the request. Alternatively, the request is forwarded by the transaction processing system 10 to the buyer bank for processing. The decision made by the buyer bank is then relayed to the transaction processing system 10.

In the case where the request is approved, the transaction and its corresponding payment instruction are locked down against subsequent modification and assigned a bank-assured status. Optional notification may also be provided to the buyer 12, the seller 14, the buyer bank and the seller bank.

In the case where the request is rejected, the transaction and its corresponding payment instruction are assigned a bank-assurance-rejected status and the transaction is put on hold. Optional notification may also be provided to the buyer 12, the seller 14, the buyer bank and the seller bank.

Similarly, information relating to transactions that have a bank-assured status and for which payments are payable to the seller 14 can be provided by the transaction processing system 10 to the seller bank. Such information can then be used by the seller bank to provide financing services as will be further described below. This enables the seller bank to recognize which transactions are financed and guaranteed by the buyer bank so that credit for these transactions will not be passed to the seller.

In another exemplary aspect, the transaction processing system 10 provides the ability to allow a buyer bank to offer and handle advance payment to a seller 14 at a discount; this is alternatively called "buyer bank payable discounting" ("BBPD"). This capability is designed to allow the buyer bank to offer and provide payable discounting to the seller for those future payments that the buyer bank has provided buyer bank payment assurance for. In other words, since the buyer bank has already guaranteed payment for certain payments payable to the seller 14 as described above, the buyer bank may wish to make such payments to the seller 14 at a discount in advance of the payment due dates. This allows the seller 14 to receive any owed account receivables at an earlier time prior to their due dates.

To provide the foregoing functionality, the transaction processing system 10 provides a graphical user interface (GUI) to allow the seller 14 to display and review all its transactions that qualify for BBPD from the buyer bank. Qualified transactions include, for example, transactions have been granted a bank-assured status by the buyer bank. Optionally, when the buyer bank determines the bank-assured status of a transaction, the buyer bank may also indicate whether the transaction qualifies for BBPD. In some instances, the buyer bank may disqualify a transaction for BBPD even though the bank-assured status is given. Using the GUI, the seller 14 can then select one or more qualified transactions that it would like to request for BBPD from the buyer bank. Requests pertaining to selected transactions are then forwarded by the transaction processing system 10 to the buyer bank. A status of the "BBPD Requested" may be assigned to each selected transaction. Alternatively, the transaction processing system 10 allows the buyer bank to identify transactions that qualify for BBPD and forward information relating to any identified transactions to the seller 14 for consideration. Similarly, the seller 14 can then use the transaction processing system 10 to request BBPD for selected transactions.

In addition to the requests, the transaction processing system 10 may also forward the selected transactions to the buyer bank. Using a GUI, the buyer bank may interact with the transaction processing system 10 to review and approve or reject the requests. In one implementation, the BBPD approval is based on at least two (2) levels according to the value of payment associated with the transaction.

After approving a transaction, the buyer bank then uses the GUI to provide additional information, such as, BBPD or lending terms to the transaction processing system 10. These terms include, for example, lender's name, discount rate, start date, end date, total duration, total discount amount, handling fee, net process amount (i.e., original payment amount minus discount rate minus handling fee).

After the transaction has been approved by the buyer bank, the transaction processing system 10 notifies the seller 14 of the approval. A status of "BBPD Approved" may then be assigned to the approved transaction. The seller 14 can then use the transaction processing system 10 to review the approved transaction and the associated BBPD terms. The seller 14 can then either accept or decline the approved transaction. If the approved transaction is accepted by the seller 14, the transaction processing system 10 displays a formal agreement for final approval. The formal agreement includes various types of information including, for example, the BBPD terms for the approved transaction and any other appropriate legal verbiage. In one implementation, some or all of the information contained in the formal agreement is specific to the buyer bank. The transaction processing system 10 provides the ability for the buyer bank to provide and amend its information in the formal agreement.

Once the formal agreement is accepted by the seller 14, the transaction processing system 10 notifies the buyer bank and updates all records relating to the approved transaction accordingly. For example, a status of "BBPD Buyer Bank Financed/Seller Accepted" is assigned to the approved transaction. The approved transaction and associated information is then forwarded to the buyer bank for additional processing.

In the event that the buyer bank rejects a selected transaction for which BBPD is requested, a status of "BBPD Rejected" may be assigned to the rejected transaction.

As described above, a transaction may be assigned one of a number of statuses. The transaction processing system 10 provides the ability to allow different parties, e.g., the seller 14 and the buyer bank, to sort transactions based on status.

While the foregoing describes primarily interactions between a seller 14 and a buyer bank with respect to BBPD, it should be understood that the transaction processing system 10 is able to handle a number of sellers 14 and buyer banks working with each other at the same time. In one instance, a seller 14 may be working with a number of buyer banks; in another instance, a buyer bank may be working with a number of sellers 14.

In yet another exemplary aspect, the transaction processing system 10 provides the ability to monitor future payables to individual sellers. This enables buyer banks to develop tranches to be used for lines of credit to sellers 14. A tranche is an aggregation of payables which represents a line of credit that can be offered to a seller 14. Typically, the payables in a tranche are several related securities but need not be so. Tranches usually have different, risk, reward and/or maturity characteristics. This is alternatively called "buyer bank payable discounting aggregation" ("BBPDA").

As described above, the transaction processing system 10 keeps track of information relating to payables for transactions based on the buyer 12, the seller 14 and the buyer bank. In addition, payables for transactions can be identified as "secured" or "unsecured" by the transaction processing system 10. A payable or payment is secured if it is bank-assured (e.g., a buyer bank has guaranteed payment) or otherwise secured by other assets.

The transaction processing system 10 allows the buyer bank to develop tranches using the available payable information. For example, tranches can be identified based on a mix of secured/unsecured payables, such as, a 30-day tranche having 60% secured payables and 40% unsecured payables.

Criteria for a tranche can be specified to the transaction processing system 10 by the buyer bank via, for example, a graphical user interface. For example, the buyer bank can specify that a tranche needs to have $1 million due between fifteen (15) and thirty (30) days with at least 70% of payables secured. Using the specified criteria, the transaction processing system 10 monitors the payable information and builds the desired tranche. When sufficient payables are identified that satisfy the foregoing criteria, the transaction processing system 10 builds the corresponding tranche. All identified payables are then associated with the corresponding tranche. It should be noted that once a payable is used to build a first tranche, it cannot be used in another tranche as long as that payable is associated with that first tranche. However, a payable can be made to associate with another tranche. For example, if a payable no longer qualifies for association with the first tranche, it can then be associated with another tranche.

Once a tranche is built, the buyer bank is notified by the transaction processing system 10 that the desired tranche is available. The buyer bank can then offer the tranche to the seller 14 as a line of credit. The line of credit may be subject to certain terms and conditions set by the buyer bank. For example, the buyer bank may discount one or more future payables in the tranche. The transaction processing system 10 can relay the tranche offer and the associated terms and conditions to the seller 14.

In one implementation, a tranche corresponds to only one buyer bank and payables associated therewith belong to only one seller 14. In other words, the transaction processing system 10 allows a buyer bank to build a tranche using its payables that belong to a particular seller 14.

In addition, the transaction processing system 10 allows a seller 14 to request BBPDA. The request may include information, such as, identification of one or more buyer banks and terms and conditions desired by the seller 14. Once the request is received and if no buyer bank is specified, the transaction processing system 10 identifies payables that are owed to the seller 14 and informs one or more buyer banks that have outstanding payables owed to the seller 14 of the issuance of the BBPDA request by the seller 14. The one or more buyer banks may then use the transaction processing system 10 to create an appropriate tranche and respond to the seller 14. If a particular buyer bank is specified, then the transaction processing system 10 accordingly contacts the specified buyer bank.

Once a tranche is made available to the seller 14, the transaction processing system 10 monitors and manages the activities relating to the tranche, for example, the seller 14 drawing against the tranche. The transaction processing system 10 also provides the ability for the seller 14 to push a credit back to the buyer bank for any funds due the buyer bank (e.g., balance of line of credit and/or additional interest).

In addition, the transaction processing system 10 monitors payables in the tranche that have been paid by a buyer 12. The transaction processing system 10 notifies the buyer bank when a payment for payable associated with the tranche is made by the buyer 12. When the buyer bank receives the payment, the buyer bank uses the transaction processing system 10 to send a message to the seller 14 letting the seller 14 know how to close the corresponding transaction on its system.

In one exemplary aspect, the transaction processing system 10 provides the ability for a seller bank to provide financing to a seller 14 for a given payment. This is similar to BBPD described above. The transaction processing system 10 allows the seller bank to monitor receivables that the seller bank is going to receive on behalf of the seller 14. As a result, the seller bank is able to use the transaction processing system 10 to create an advance loan against a future payment/receivable.

In one scenario, the transaction processing system 10 allows the seller bank to proactively search for transactions that the seller may wish to receive financing. Optionally, to facilitate the search and identify qualified transactions, the transaction processing system 10 notifies the seller bank when a transaction is assigned a buyer-assured and/or bank-assured status. In addition, the transaction processing system 10 may provide functionality to allow the seller bank to search for qualified transactions using different criteria. Such criteria include, for example, specific sellers, sellers that are willing to consider financing, and transaction status, payment total, payment date, etc. Alternatively, the transaction processing system 10 allows the seller 14 to identify and select transactions that it wishes to obtain financing. Information relating to the selected transactions is then forwarded to the seller bank. The seller bank then determines which of the transactions selected by the seller 14 are to be offered financing.

Upon the seller bank identifying the qualified transactions, the transaction processing system 10 assigns a status of "Seller Financing Offered" to these transactions. Optionally, the transaction processing system 10 allows the seller bank to provide financing terms and conditions associated with these transactions. Information relating to these transactions and corresponding financing terms and conditions are then forwarded to the seller 14 for review and selection.

The seller 14 can then accept or reject each of the offered transactions. The transaction processing system 10 accordingly assigns the appropriate status to each transaction, such as, "Seller Financing Accepted" or "Seller Financing Rejected".

If a financing offer is accepted, the transaction processing system 10 then collects the relevant information and forwards such information to the seller bank for further processing. Optionally, when a financing offer is accepted, the transaction processing system 10 may display a formal agreement for approval by the seller 14. The formal agreement includes various types of information, such as, terms and conditions and other legal verbiage associated with the financing offer.

In one exemplary embodiment, the transaction processing system 10 provides the ability to monitor future receivables to individual sellers. This is similar to BBPDA described above. This enables seller banks to develop tranches to be used for lines of credit to sellers 14. A tranche is an aggregation of receivables which represents a line of credit that can be offered to a seller 14. Typically, the receivables in a tranche are several related securities but need not be so. Tranches usually have different, risk, reward and/or maturity characteristics. This is alternatively called "seller bank receivable discounting aggregation" ("SBRDA").

As described above, the transaction processing system 10 keeps track of information relating to receivables for transactions based on the buyer 12, the seller 14 and the seller bank. In addition, receivables for transactions can be identified as "secured" or "unsecured" by the transaction processing system 10. A receivable is secured if it is bank-assured (e.g., a buyer bank has guaranteed payment) or otherwise secured by other assets.

The transaction processing system 10 allows the seller bank to develop tranches using the available receivable information. For example, tranches can be identified based on a mix of secured/unsecured receivables, such as, a 30-day tranche having 60% secured receivables and 40% unsecured receivables.

Criteria for a tranche can be specified to the transaction processing system 10 by the seller bank. For example, the seller bank can specify that a tranche needs to have $1 million due between fifteen (15) and thirty (30) days with at least 70% of receivables secured. Using the specified criteria, the transaction processing system 10 monitors the receivable information and builds the desired tranche. When sufficient receivables are identified that satisfy the foregoing criteria, the transaction processing system 10 builds the corresponding tranche. All identified receivables are then associated with the corresponding tranche. It should be noted that once a receivable is used to build a first tranche, it cannot be used in another tranche as long as that receivable is associated with that first tranche. However, a receivable can be made to associate with another tranche. For example, if a receivable no longer qualifies for association with the first tranche, it can then be associated with another tranche.

Once a tranche is built, the seller bank is notified by the transaction processing system 10 that the desired tranche is available. The seller bank can then offer the tranche to the seller 14 as a line of credit. The line of credit may be subject to certain terms and conditions set by the seller bank. For example, the seller bank may discount one or more future receivables in the tranche. The transaction processing system 10 can relay the tranche offer and the associated terms and conditions to the seller 14.

In one implementation, a tranche corresponds to only one seller bank and receivables associated therewith belong to only one seller 14. In other words, the transaction processing system 10 allows a seller bank to build a tranche using its receivables that belong to a particular seller 14.

In addition, the transaction processing system 10 allows a seller 14 to request SBRDA. The request may include information, such as, identification of one or more seller banks and terms and conditions desired by the seller 14. Once the request is received and if no buyer bank is specified, the transaction processing system 10 identifies receivables that are owed to the seller 14 and informs one or more seller banks that have outstanding receivables owed to the seller 14 of the issuance of the SBRDA request by the seller 14. The one or more seller banks may then use the transaction processing system 10 to create an appropriate tranche and respond to the seller 14. If a particular seller bank is specified, then the transaction processing system 10 accordingly contacts the specified seller bank.

Once a tranche is made available to the seller 14, the transaction processing system 10 monitors and manages the activities relating to the tranche, for example, the seller 14 drawing against the tranche. The transaction processing system 10 also provides the ability for the seller 14 to push a credit back to the seller bank for any funds due the seller bank (e.g., balance of line of credit and/or additional interest).

In addition, the transaction processing system 10 monitors receivables in the tranche that have been received from a buyer 12. The transaction processing system 10 notifies the seller bank when a payment for receivable associated with the tranche is made by the buyer 12. When the seller bank receives the payment, the seller bank uses the transaction processing system 10 to send a message to the seller 14 letting the seller 14 know how to close the corresponding transaction on its system.

The transaction processing system 10 further includes reporting mechanisms which generate reports for various parties for a number of purposes. Based on the disclosure and teachings provided herein, a person of ordinary skill in the art will appreciate how to generate various types of reports using the present invention.

It should be understood that the present invention can be implemented in the form of control logic, in a modular or integrated manner, using software, hardware or a combination of both. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system comprising a server and a computer readable medium stored on the server for providing financing services, wherein the server executes:
    control logic on the computer readable medium configured to monitor a plurality of transactions between a buyer and a seller;
    control logic on the computer readable medium for sending a payment instruction to the buyer for one or more transactions in the plurality of transactions;
    control logic on the computer readable medium configured to provide the buyer with the ability to assign buyer-assured status to the one or more transactions after the buyer receives the payment instruction, wherein the buyer assured status indicates that payment for the one or more transactions is assured by the buyer and is an unconditional, irrevocable guarantee that payment will be made by the buyer on a specified date with certainty;
    control logic on the computer readable medium for storing terms and conditions relating to buyer assured status;
    control logic on the computer readable medium configured to provide the buyer with the ability to request assurance from a buyer bank for the one or more transactions and control logic on the computer readable medium configured to determine whether to provide assurance to the one or more transactions requested by the buyer and assign a bank-assured status to each transaction for which assurance is to be provided, wherein the buyer bank handles processing of payables for the plurality of transactions on behalf of the buyer;
    control logic on the computer readable medium configured to provide the buyer bank with the ability to offer buyer bank payable discounting to the seller;
    control logic on the computer readable medium configured to provide the buyer bank with the ability to offer buyer bank payable discounting aggregation to the seller;
    control logic on the computer readable medium configured to provide a seller bank with the ability to offer seller bank receivable discounting to the seller, wherein the seller bank handles processing of receivables from the plurality of transactions on behalf of the seller; and
    control logic on the computer readable medium configured to provide the seller bank with the ability to offer seller bank receivable discounting aggregation to the seller.

2. The system of claim 1 wherein once the buyer-assured status is assigned to the one or more transactions, all information relating to the transaction is locked down and protected against subsequent modification.

3. The system of claim 1 wherein the control logic configured to determine whether to provide assurance further comprises:
    control logic on the computer readable medium configured to maintain terms and conditions relating to assurance; and
    control logic on the computer readable medium configured to utilize the terms and conditions relating to assurance to determine whether to provide assurance to the one or more transactions requested by the buyer.

4. The system of claim 1 wherein the control logic configured to determine whether to provide assurance further comprises:
    control logic on the computer readable medium configured to forward to buyer bank information relating to assurance requests for the one or more transactions requested by the buyer; and
    control logic on the computer readable medium configured to process responses from the buyer bank with respect to the assurance requests.

5. The system of claim 1 wherein the control logic configured to provide the buyer bank with the ability to offer buyer bank payable discounting (BBPD) to the seller further comprises:
    control logic on the computer readable medium configured to display to the seller transactions that qualify for BBPD from the buyer bank and provide the seller with the ability to request BBPD for one or more transactions selected from the qualified transactions; and
    control logic on the computer readable medium configured to provide the buyer bank with the ability to approve the selected one or more transactions for BBPD.

6. The system of claim 5 wherein the transactions that qualify for BBPD include transactions having the bank-assured status and/or transactions that have been approved by the buyer bank for BBPD.

7. The system of claim 5 wherein the control logic configured to provide the buyer bank with the ability to offer buyer bank payable discounting (BBPD) to the seller further comprises:
    control logic on the computer readable medium configured to maintain general terms and conditions provided by the buyer bank for BBPD, wherein the general terms and conditions can be modified by the buyer bank;
    control logic on the computer readable medium configured to provide the buyer bank with the ability to specify terms and conditions corresponding to each of the approved transactions for BBPD; and
    control logic on the computer readable medium configured to present to the seller for acceptance the approved transactions, the general terms and conditions, and the specified terms and conditions corresponding to each of the approved transactions for BBPD.

8. The system of claim 1 wherein the control logic configured to provide the buyer bank with the ability to offer buyer bank payable discounting aggregation (BBPDA) to the seller further comprises:

control logic on the computer readable medium configured to build a tranche based on a set of criteria specified by the buyer bank, wherein the tranche is associated with one or more payables corresponding to one or more of the plurality of transactions; and control logic on the computer readable medium configured to present the tranche as a line of credit to the seller.

9. The system of claim 8 wherein at least one of the one or more payables is secured.

10. The system of claim 8 further comprising:
control logic on the computer readable medium configured to maintain terms and conditions relating to the line of credit, wherein the terms and conditions relating to the line of credit are provided by the buyer bank; and
control logic on the computer readable medium configured to present the terms and conditions relating to the line of credit to the seller.

11. The system of claim 8 further comprising:
control logic on the computer readable medium configured to monitor activities incurred with respect to the tranche.

12. The system of claim 8 further comprising:
control logic on the computer readable medium configured to provide the seller with the ability to issue a BBPDA request; and
control logic on the computer readable medium configured to forward the BBPDA request to the buyer bank;
wherein the set of criteria specified by the buyer bank is based on the BBPDA request.

13. The system of claim 8 further comprising:
control logic configured to monitor the one or more payables associated with the tranche to ensure that the set of criteria is satisfied.

14. The system of claim 1 wherein the control logic configured to provide the seller bank with the ability to offer seller bank receivable discounting (SBRD) to the seller further comprises:
control logic on the computer readable medium configured to display to the seller bank transactions that qualify for SBRD;
control logic on the computer readable medium configured to provide the seller bank with the ability to offer SBRD to the seller for one or more transactions selected from the qualified transactions; and
control logic on the computer readable medium configured to provide the seller with the ability to accept SBRD for one or more transactions offered by the seller bank.

15. The system of claim 14 wherein the transactions that qualify for SBRD include transactions having the bank-assured status.

16. The system of claim 14 wherein the control logic configured to provide the seller bank with the ability to offer seller bank receivable discounting (SBRD) to the seller further comprises:
control logic on the computer readable medium configured to maintain general terms and conditions provided by the seller bank for SBRD, wherein the general terms and conditions can be modified by the seller bank;
control logic on the computer readable medium configured to provide the seller bank with the ability to specify terms and conditions corresponding to each of the one or more transactions offered by the seller bank for SBRD; and
control logic on the computer readable medium configured to present to the seller for acceptance the one or more transactions offered by the seller bank, the general terms and conditions, and the specified terms and conditions corresponding to each of the one or more transactions offered by the seller bank for SBRD.

17. The system of claim 1 wherein the control logic configured to provide the seller bank with the ability to offer seller bank receivable discounting (SBRD) to the seller further comprises:
control logic on the computer readable medium configured to display to the seller transactions that qualify for SBRD from the seller bank and allow the seller to request SBRD for one or more transactions selected from the qualified transactions; and
control logic on the computer readable medium configured to provide the seller bank with the ability to approve the selected one or more transactions for SBRD.

18. The system of claim 17 wherein the transactions that qualify for SBRD include transactions having the bank-assured status.

19. The system of claim 17 wherein the control logic configured to provide the seller bank with the ability to offer seller bank receivable discounting (SBRD) to the seller further comprises:
control logic on the computer readable medium configured to maintain general terms and conditions provided by the seller bank for SBRD, wherein the general terms and conditions can be modified by the seller bank;
control logic on the computer readable medium configured to provide the seller bank with the ability to specify terms and conditions corresponding to each of the approved transactions for SBRD; and
control logic on the computer readable medium configured to present to the seller for acceptance the approved transactions, the general terms and conditions, and the specified terms and conditions corresponding to each of the approved transactions for SBRD.

20. The system of claim 1 wherein the control logic configured to provide the seller bank with the ability to offer seller bank receivable discounting aggregation (SBRDA) to the seller further comprises:
control logic on the computer readable medium configured to build a tranche based on a set of criteria specified by the seller bank, wherein the tranche is associated with one or more receivables corresponding to one or more of the plurality of transactions; and
control logic on the computer readable medium configured to present the tranche as a line of credit to the seller.

21. The system of claim 20 wherein at least one of the one or more receivables is secured.

22. The system of claim 20 further comprising:
control logic on the computer readable medium configured to maintain terms and conditions relating to the line of credit, wherein the terms and conditions relating to the line of credit are provided by the seller bank; and
control logic on the computer readable medium configured to present the terms and conditions relating to the line of credit to the seller.

23. The system of claim 20 further comprising:
control logic on the computer readable medium configured to monitor activities incurred with respect to the tranche.

24. The system of claim 20 further comprising:
control logic on the computer readable medium configured to provide the seller with the ability to issue a SBRDA request; and
control logic on the computer readable medium configured to forward the SBRDA request to the seller bank;
wherein the set of criteria specified by the seller bank is based on the SBRDA request.

25. The system of claim 20 further comprising:
control logic on the computer readable medium configured to monitor the one or more receivables associated with the tranche to ensure that the set of criteria is satisfied.

26. The system of claim 1 further comprising control logic on the computer readable medium for specifying a particular funding source of each transaction wherein assurance has been requested by the buyer.

27. The system of claim 1 wherein the transaction processing system further comprises:
an invoice pre-processor configured to receive a plurality of invoices in an electronic format and generate standard invoice files for the plurality of invoices;
a payment manager coupled to the invoice pre-processor and configured to receive the standard invoices files, wherein the payment manager is further configured to generate payment instructions for the standard invoice files;
a pricing engine coupled to the payment manager, wherein the pricing engine is configured to receive the payment instructions and determine transaction fees associated with the payment instructions, wherein the transaction fees are based on terms and conditions stored in a database coupled to the pricing engine; and
an authorization and settlement interface coupled to the pricing engine and configured to communicate with a data transport and processing network.

28. The system of claim 1, wherein each of the buyer and the seller have multiple transaction accounts from which a payment can be debited or credited.

29. The system of claim 1, wherein an approval of the payment instruction can be supplied by a third party system on behalf of the buyer.

30. The system of claim 1, wherein the payment instruction is sent to the buyer without any accompanying invoice.

\* \* \* \* \*